United States Patent
Jiang et al.

(10) Patent No.: US 12,084,557 B2
(45) Date of Patent: Sep. 10, 2024

(54) SEMI-RIGID MELAMINE FOAM PLASTIC AND PREPARATION METHOD THEREOF

(71) Applicant: ZHEJIANG YADINA NEW MATERIAL TECHNOLOGY CO., LTD., Zhejiang (CN)

(72) Inventors: Hongwei Jiang, Zhejiang (CN); Xueping Gu, Zhejiang (CN); Shaolin Xu, Zhejiang (CN); Hongjian Yu, Zhejiang (CN); Xiaodi Jiang, Zhejiang (CN); Binxian Pan, Zhejiang (CN)

(73) Assignee: ZHEJIANG YADINA NEW MATERIAL TECHNOLOGY CO., LTD., Zhejiang (CN)

(*) Notice: Subject to any disclaimer, the term of this patent is extended or adjusted under 35 U.S.C. 154(b) by 513 days.

(21) Appl. No.: 17/416,893

(22) PCT Filed: Jun. 12, 2020

(86) PCT No.: PCT/CN2020/095888
§ 371 (c)(1),
(2) Date: Jun. 21, 2021

(87) PCT Pub. No.: WO2021/189674
PCT Pub. Date: Sep. 30, 2021

(65) Prior Publication Data
US 2022/0340728 A1    Oct. 27, 2022

(30) Foreign Application Priority Data
Mar. 27, 2020 (CN) .......................... 202010232102.1

(51) Int. Cl.
*C08J 9/14* (2006.01)
*C08G 12/32* (2006.01)
*C08G 12/40* (2006.01)

(52) U.S. Cl.
CPC .............. *C08J 9/141* (2013.01); *C08G 12/32* (2013.01); *C08G 12/40* (2013.01); *C08G 2110/0016* (2021.01); *C08G 2110/005* (2021.01); *C08J 2203/14* (2013.01); *C08J 2205/05* (2013.01); *C08J 2361/28* (2013.01)

(58) Field of Classification Search
CPC .... C08J 9/141; C08J 2203/14; C08J 2205/05; C08J 2361/28; C08J 9/0023; C08J 2201/026; C08J 2205/08; C08J 9/0085; C08J 2203/202; C08J 2361/32; C08G 12/32; C08G 12/40; C08G 2110/0016; C08G 2110/005; Y02P 20/10; C08K 7/06
See application file for complete search history.

(56) References Cited

FOREIGN PATENT DOCUMENTS

| CN | 104559051 A | * | 4/2015 | |
|----|-------------|---|--------|------|
| CN | 105733183 A | * | 7/2016 | ............. C08G 12/40 |

OTHER PUBLICATIONS

Data sheet for KH550. ChenGuang. (Year: 2024).*

* cited by examiner

*Primary Examiner* — K. Boyle
(74) *Attorney, Agent, or Firm* — Jeenam Park

(57) ABSTRACT

A method for preparing a semi-rigid melamine foam plastic, comprising Step (1): adding a formaldehyde solution and polyvinyl alcohol (PVA) to a reactor, heating the reactor, and adding alkali; Step (2): feeding solid melamine powder and a modifier 3-aminopropyltriethoxysilane (APTES) into the reactor, raising the temperature in the reactor to 75-85° C., adjusting the pH value of the solution of material by adding acid; heating the solution of material, performing a heat preservation reaction, and then adding alkali, Step (3): feeding a predetermined amount of foaming agent, emulsifier, auxiliary agent and curing agent into a stirring reactor to obtain a mixed auxiliary agent; pumping the mixed auxiliary agent and the semi-rigid modified melamine resin into an emulsifier; placing the emulsified resin into a microwave heating chamber for microwave foaming; Step (4): cutting the semi-rigid melamine foam plastic obtained in step (3) and then drying.

8 Claims, No Drawings

SEMI-RIGID MELAMINE FOAM PLASTIC AND PREPARATION METHOD THEREOF

TECHNICAL FIELD

This invention generally relates to the field of foam plastics, and more particularly, to a semi-rigid melamine foam plastic and a preparation method thereof.

BACKGROUND

Foam plastic, a high polymer material formed by dispersing a large number of gas micropores in solid plastic, possesses excellent properties such as light weight, heat insulation, sound absorption and shock absorption. Melamine foam plastic, which resembles a polyurethane sponge, has been extensively used in various fields including construction, transportation, vehicle manufacturing, acoustic engineering, electronic information and surface cleaning. Melamine foam plastic was first introduced by BASF Incorporation (Germany). Since then, it has long been an expensive monopoly product. Despite providing the benefits of high stability, low temperature flexibility, high permeability, high abrasion resistance and wide practical temperature-area, its mechanical properties are relatively poor.

Presently, researches on melamine foam plastic primarily focus on soft foam (density lower than or equal to 12 kg/m$^3$). Although soft foam has advantages such as low density, high toughness and high flame retardance, its shortcomings such as low hardness, deformation and breakage severely restrict its application. Therefore, to meet the market demand, it is urgent for those skilled in the art to develop a novel semi-rigid melamine foam plastic.

SUMMARY

The purpose of the present invention is to provide a semi-rigid melamine foam plastic and a preparation method thereof.

To achieve the above purpose, the present invention adopts the following technical solution:

A method for preparing a semi-rigid melamine foam plastic, comprising the steps of:

Step (1): feeding paraformaldehyde into a reactor, adding a formaldehyde solution and polyvinyl alcohol (PVA), heating the reactor until the solid particles in the reactor are completely dissolved, and then adding a proper amount of alkali to adjust the pH value in the reactor to be 8.0 to 9;

Step (2): synthesizing a modified resin: feeding solid melamine powder and a modifier 3-aminopropyltriethoxysilane (APTES) into the reactor, raising the temperature in the reactor to 75-85° C., and performing a heat preservation reaction for 20-50 minutes; after the material in the reactor is cooled to room temperature, adjusting the pH value of the solution of material in the reactor to be 3-4 by adding an appropriate amount of acid; heating the solution of material, performing a heat preservation reaction for 40-80 minutes when the temperature rises to 80-95° C., and then judging the end point of the reaction by testing the cloud point of the material; when the reaction ends, immediately adding a proper amount of alkali to adjust the pH value in the reactor to be 8.5-9.0, thereby obtaining a semi-rigid modified melamine resin;

Step (3): curing and foaming: feeding a proper amount of foaming agent, emulsifier, auxiliary agent and curing agent into a stirring reactor, and uniformly stirring and mixing to obtain a mixed auxiliary agent; pumping the mixed auxiliary agent and the semi-rigid modified melamine resin into an emulsifier for mixing and emulsification; placing the emulsified resin into a microwave heating chamber for microwave foaming, thereby forming a semi-rigid melamine foam plastic with a high-density open-cell structure;

Step (4): cutting and drying: cutting the semi-rigid melamine foam plastic obtained in step (3) through a cutting machine and then drying, thereby obtaining a finished semi-rigid melamine foam plastic product.

In another preferred embodiment, the using amount of PVA is 1-15 wt % of the amount of melamine, and the using amount of APTES is 5-25 wt % of the amount of melamine. More preferably, the using amount of PVA is 5-12 wt % of the amount of melamine, and the using amount of APTES is 10-20 wt % of the amount of melamine. An excessive dosage may result in free APTES in the resin system, which may affect the heat resistance and flame retardance of the foam plastic.

In another preferred embodiment, the molar ratio of melamine, paraformaldehyde and formaldehyde solution is 1:2-3:1-2.

In another preferred embodiment, the feeding mass ratio of the semi-rigid modified melamine resin to the mixed auxiliary agent is 100:10-40%.

In another preferred embodiment, the foaming agent is one or a mixture of the materials selected from water, pentane, hexane and petroleum ether, the emulsifier is one or a mixture of the materials selected from alkylphenol ethoxylates, fatty acid polyglycol ether and alkyl trimethyl ammonium salt, and the curing agent is one or a mixture of the materials selected from sulfuric acid, hydrochloric acid, formic acid, acetic acid and nitric acid.

In another preferred embodiment, the alkali used for adjusting the pH value is any one selected from a sodium hydroxide solution having a mass percent concentration of 30-40% and triethanolamine, and the acid used for adjusting the pH value is any one selected from a nitric acid solution having a 45% mass percent concentration, a hydrochloric acid solution having a 30% mass percent concentration, an acetic acid solution having a 35% mass percent concentration and a formic acid solution having a 30% mass percent concentration.

In another preferred embodiment, the auxiliary agent is one or a combination of the materials selected from a reinforced material, a nanomaterial, a pigment, a hydrophobic agent and other materials used for improving the performance of the foam. The using amount of the auxiliary agent is 0-10 wt % of the amount of resin. The choice of the auxiliary agent depends on the performance requirement of the foam, which is a common knowledge for those skilled in this field.

A semi-rigid melamine foam plastic prepared through adopting the preparation method of the present invention, wherein the density of the semi-rigid melamine foam plastic is 15-35 kg/m$^3$, and more preferably, the density of the semi-rigid melamine foam plastic is 15-28 kg/m$^3$.

The performance parameters of the semi-rigid melamine foam plastic prepared through adopting the preparation method of the present invention are shown in Table 1:

TABLE 1

| Performance | Result | Testing Standard |
|---|---|---|
| Apparent Density (kg/m$^3$) | 15~35 | GB/T6343-2009 |
| Tensile Strength (kPa)≥ | 50 | GB/T6344-2008 |
| Elongation at Break (%)≥ | 5 | GB/T6344-2008 |
| Permanent Compression Set (%)≤ | 10 | GB/T6669-2008 |
| Resilience Rate (%)≥ | 50 | GB/T6670-2008 |
| Tearing Strength (N/m)≥ | 30 | GB/T10808-2006 |
| Collapsed Hardness (N)≥ | 1000 | GB/T10807-2006 |

Compared with the prior art, the present invention has the following advantages: the semi-rigid melamine foam plastic of the present invention has improved collapsed hardness and more stable overall dimensions compared with the soft melamine foam plastic, and can be extensively used in industries such as building construction, machinery and ship manufacturing and industrial equipment manufacturing.

The semi-rigid melamine foam plastic provided by the present invention is an intrinsic flame-retardant foam prepared by using melamine formaldehyde resin undergoing curing and foaming processes. The prepared melamine foam plastic possesses high flame retardance, high sound-absorbing performance, high heat resistance and high heat preservation performance, and can be used for preparing oil-water separation materials, super capacitors, sound-absorbing materials, thermal insulation and flame-retardant materials, etc.

DETAILED DESCRIPTION

Detailed embodiments are combined hereinafter to further elaborate the technical solution of the present invention. It should be understood that the described embodiments are merely a representative part but not all of the embodiments of the present invention. Any modification and/or alteration made by those skilled in the art without departing from the spirit of the present invention shall fall into the scope of the present invention.

In this invention, unless being clearly stated, all the parts and percentages are units of weight, the equipment and raw materials can be purchased from the market or are commonly used in the field, and the methods adopted in the following embodiments are conventional methods in the art.

Embodiment 1

A method for preparing a semi-rigid melamine foam plastic, comprising the steps of:
  Step (1): feeding paraformaldehyde into a reactor, adding a formaldehyde solution and PVA, heating the reactor until the solid particles in the reactor are completely dissolved, and then adding a proper amount of alkali to adjust the pH value in the reactor to be 8.0 to 9;
  Step (2): synthesizing a modified resin: feeding solid melamine powder and a modifier 3-aminopropyltriethoxysilane (APTES) into the reactor, raising the temperature in the reactor to 75° C., and performing a heat preservation reaction for 50 minutes; after the material in the reactor is cooled to room temperature, adjusting the pH value of the solution of material in the reactor to be 3.5-4 by adding an appropriate amount of acid; heating the solution of material, performing a heat preservation reaction for 40 minutes when the temperature rises to 90° C., and then judging the end point of the reaction by testing the cloud point of the material; when the reaction ends, immediately adding a proper amount of alkali to adjust the pH value in the reactor to be 8.5-9.0, thereby obtaining a semi-rigid modified melamine resin;
  Step (3): curing and foaming: feeding a proper amount of foaming agent, emulsifier, auxiliary agent and curing agent into a stirring reactor, and uniformly stirring and mixing to obtain a mixed auxiliary agent; pumping the mixed auxiliary agent and the semi-rigid modified melamine resin into an emulsifier for mixing and emulsification; placing the emulsified resin into a microwave heating chamber for microwave foaming, thereby forming a semi-rigid melamine foam plastic with a high-density open-cell structure;
  Step (4): cutting and drying: cutting the semi-rigid melamine foam plastic obtained in step (3) through a cutting machine and then drying, thereby obtaining a finished semi-rigid melamine foam plastic product.

In the aforesaid method, the molar ratio of melamine, paraformaldehyde and formaldehyde solution is 1:2.5:1.5. The using amount of PVA is 5 wt % of the amount of melamine, and the using amount of APTES is 25 wt % of the amount of melamine.

In step (2), the foaming agent is hexane, the emulsifier is alkylphenol ethoxylates and the curing agent is hydrochloric acid.

In step (3), the feeding mass ratio of the semi-rigid modified melamine resin to the mixed auxiliary agent is 100:10.

In this embodiment, the alkali used for adjusting the pH value is a sodium hydroxide solution having a mass percentage concentration of 30-40%, and the acid used for adjusting the pH value is a nitric acid solution having a mass percentage concentration of 45%.

The microwave foaming oven is a tunnel-type microwave foaming oven. The emulsified resin is evenly distributed at the front end of the tunnel oven and continuously passes through the heating chamber of the oven along with a conveying device such that the foam plastic with a high-density open-cell structure is formed. The microwave frequency of the microwave oven is 2450 MHz, the growth duration of microwave foaming is 4 minutes, and the temperature of the oven heating chamber is 90-100° C.

Embodiment 2

A method for preparing the semi-rigid melamine foam plastic, comprising the steps of:
  Step (1): feeding paraformaldehyde into a reactor, adding a formaldehyde solution and PVA, heating the reactor until the solid particles in the reactor are completely dissolved, and then adding a proper amount of alkali to adjust the pH value in the reactor to be 8.0 to 9;
  Step (2): synthesizing a modified resin: feeding solid melamine powder and a modifier 3-aminopropyltriethoxysilane (APTES) into the reactor, raising the temperature in the reactor to 85° C., and performing a heat preservation reaction for 20 minutes; after the material in the reactor is cooled to room temperature, adjusting the pH value of the solution of material in the reactor to be 3.5-4 by adding an appropriate amount of acid; heating the solution of material, performing a heat preservation reaction for 80 minutes when the temperature rises to 95° C., and then judging the end point of the reaction by testing the cloud point of the material; when the reaction ends, immediately adding a proper amount of alkali to adjust the pH value in the reactor to be 8.5-9.0, thereby obtaining a semi-rigid modified melamine resin;

Step (3): curing and foaming: feeding a proper amount of foaming agent, emulsifier, auxiliary agent and curing agent into a stirring reactor, and uniformly stirring and mixing to obtain a mixed auxiliary agent; pumping the mixed auxiliary agent and the semi-rigid modified melamine resin into an emulsifier for mixing and emulsification; placing the emulsified resin into a microwave heating chamber for microwave foaming, thereby forming a semi-rigid melamine foam plastic with a high-density open-cell structure;

Step (4): cutting and drying: cutting the semi-rigid melamine foam plastic obtained in step (3) through a cutting machine and then drying, thereby obtaining a finished semi-rigid melamine foam plastic product.

In the aforesaid method, the molar ratio of melamine, paraformaldehyde and formaldehyde solution is 1:2:1. The using amount of PVA is 12 wt % of the amount of melamine, and the using amount of APTES is 20 wt % of the amount of melamine.

In step (2), the foaming agent is a mixture of hexane and petroleum ether in a mass ratio of 1:1; the emulsifier is fatty acid polyethylene glycol ether, and the curing agent is acetic acid.

In step (3), the feeding mass ratio of the semi-rigid modified melamine resin to the mixed auxiliary agent is 100:20.

In this embodiment, the alkali used for adjusting the pH value is a sodium hydroxide solution having a mass percentage concentration of 30-40%, and the acid used for adjusting the pH value is a nitric acid solution having a mass percentage concentration of 45%.

The microwave foaming oven is a tunnel-type microwave foaming oven. The emulsified resin is evenly distributed at the front end of the tunnel oven and continuously passes through the heating chamber of the oven along with a conveying device such that the foam plastic with a high-density open-cell structure is formed. The microwave frequency of the microwave oven is 2450 MHz, the growth duration of microwave foaming is 4 minutes, and the temperature of the oven heating chamber is 90-100° C.

Embodiment 3

A method for preparing the semi-rigid melamine foam plastic, comprising the steps of:

Step (1): feeding paraformaldehyde into a reactor, adding a formaldehyde solution and PVA, heating the reactor until the solid particles in the reactor are completely dissolved, and then adding a proper amount of alkali to adjust the pH value in the reactor to be 8.0 to 9;

Step (2): synthesizing a modified resin: feeding solid melamine powder and a modifier 3-aminopropyltriethoxysilane (APTES) into the reactor, raising the temperature in the reactor to 80° C., and performing a heat preservation reaction for 30 minutes; after the material in the reactor is cooled to room temperature, adjusting the pH value of the solution of material in the reactor to be 3.5-4 by adding an appropriate amount of acid; heating the solution of material, performing a heat preservation reaction for 60 minutes when the temperature rises to 80° C., and then judging the end point of the reaction by testing the cloud point of the material; when the reaction ends, immediately adding a proper amount of alkali to adjust the pH value in the reactor to be 8.5-9.0, thereby obtaining a semi-rigid modified melamine resin;

Step (3): curing and foaming: feeding a proper amount of foaming agent, emulsifier, auxiliary agent and curing agent into a stirring reactor, and uniformly stirring and mixing to obtain a mixed auxiliary agent; pumping the mixed auxiliary agent and the semi-rigid modified melamine resin into an emulsifier for mixing and emulsification; placing the emulsified resin into a microwave heating chamber for microwave foaming, thereby forming a semi-rigid melamine foam plastic with a high-density open-cell structure;

Step (4): cutting and drying: cutting the semi-rigid melamine foam plastic obtained in step (3) through a cutting machine and then drying, thereby obtaining a finished semi-rigid melamine foam plastic product.

In the aforesaid method, the molar ratio of melamine, paraformaldehyde and formaldehyde solution is 1:3:1. The using amount of PVA is 15 wt % of the amount of melamine, and the using amount of APTES is 10 wt % of the amount of melamine.

In step (2), the foaming agent is pentane, the emulsifier is alkylphenol ethoxylates, and the curing agent is a mixture of formic acid and acetic acid in a volume ratio of 1:2.

In step (3), the feeding mass ratio of the semi-rigid modified melamine resin to the mixed auxiliary agent is 100:30.

In this embodiment, the alkali used for adjusting the pH value is a sodium hydroxide solution having a mass percentage concentration of 30-40%, and the acid used for adjusting the pH value is a nitric acid solution having a mass percentage concentration of 45%.

The microwave foaming oven is a tunnel-type microwave foaming oven. The emulsified resin is evenly distributed at the front end of the tunnel oven and continuously passes through the heating chamber of the oven along with a conveying device such that the foam plastic with a high-density open-cell structure is formed. The microwave frequency of the microwave oven is 2450 MHz, the growth duration of microwave foaming is 4 minutes, and the temperature of the oven heating chamber is 90-100° C.

The residue amount of the free formaldehyde contained in the semi-rigid melamine foam plastic prepared in this embodiment does not exceed 10 ppm.

Embodiment 4

The specific steps of the preparation method of the semi-rigid melamine foam plastic in embodiment 4 are the same as that in embodiment 1. The difference between them is: the feeding mass ratio of the semi-rigid modified melamine resin to the mixed auxiliary agent is 100:40, and the mixed auxiliary agent contains 10 wt % of carbon fiber, which is used for enhancing the flame retardant performance of the product.

Contrast Examples 1-4

To test the influence of the using amount of PVA and PTES on the properties of the foam plastic, the melamine foam plastic prepared through adopting the method of embodiment 2 is adopted to perform the contrast test. The quantitative data in the test is repeated for three times, and the average value of the results is taken.

In contrast examples 1-4, the using amount of PVA and APTES are respectively 0/0, 12%/0, 0/20% and 20%/30% of the using amount of melamine. The test results of the performance are shown in Table 2.

TABLE 2

| Performance | Embodiment 2 | Contrast Example 1 | Contrast Example 2 | Contrast Example 3 | Contrast Example 4 |
|---|---|---|---|---|---|
| Using Amount of PVA/PTES | 12%/20% | 0/0 | 12%/0 | 0/20% | 20%/30% |
| Apparent Density (kg/m$^3$) | 24 | 22 | 23 | 24 | 25 |
| Tensile Strength (kPa) | 54 | 45 | 44 | 48 | 50 |
| Elongation at Break (%) | 5.9 | 3.5 | 5.6 | 4.5 | 6.1 |
| Permanent Compression Set (%) | 8.2 | 18.4 | 14.1 | 10.8 | 9.2 |
| Resilience Rate (%) | 56 | 43 | 45 | 48 | 50 |
| Tearing Strength (N/m) | 42 | 28 | 30 | 33 | 35 |
| Collapsed Hardness (N) | 1150 | 988 | 960 | 1004 | 1020 |

The test results show that, adding a proper amount of PVA can increase the elongation at break of the foamed plastic, adding a proper amount of PTES can increase the resilience rate but decrease the heat resistance of the foam plastic, and simultaneously adding a proper amount of PVA and PTES can optimize the comprehensive performance of the foam plastic.

The test results of contrast example 4 shows that an excessive dosage can affect the performances of the product. An excessive dosage may result in free APTES in the resin system, which may affect the heat resistance and flame retardance of the foam plastic.

Each embodiment in the specification is described in a progressive manner, and each embodiment focuses on the differences from other embodiments. The same or similar parts of each embodiment can be referred to each other. For the device disclosed in the embodiment, the description is relatively simple because it corresponds to the method disclosed in the embodiment. The relevant points can refer to the description of the method.

The preparation method of the semi-rigid melamine foam plastic prepared through adopting the method of the present invention is described in detail. In the specification of the present invention, specific embodiments are described to explain the principle and implementation of the present invention. The description of the above embodiments is merely used to make the method and core idea of the present invention easy to understand. It should be understood that improvements and modifications can be made by those skilled in the art based on the specification of the present invention without departing from the principle of the present invention, and thus all of which should fall into the scope defined by the claims of the present invention.

What is claimed is:

1. A method for preparing a semi-rigid melamine foam plastic product, comprising:
    step (1): feeding paraformaldehyde into a reactor, adding a formaldehyde solution and polyvinyl alcohol (PVA), heating the reactor until solid particles in the reactor are completely dissolved, and then adding alkali to adjust the pH value in the reactor to be 8.0 to 9, wherein the solid particles are paraformaldehyde and polyvinyl alcohol;
    step (2): synthesizing a modified resin: feeding solid melamine powder and a modifier 3-aminopropyltriethoxysilane (APTES) into the reactor, raising the temperature in the reactor to 75-85° C., and performing a heat preservation reaction for 20-50 minutes; after a material in the reactor is cooled to room temperature, the material is a new material produced by paraformaldehyde, formaldehyde solution, polyvinyl alcohol, solid melamine powder and 3-aminopropyltriethoxysilane in step (1) and step (2), adjusting the pH value of a solution of the new material in the reactor to be 3-4 by adding an acid; heating the new material solution, performing a heat preservation reaction for 40-80 minutes when the temperature rises to 80-95° C., and then judging an end point of the reaction by testing the cloud point of the new material solution; when the reaction ends, immediately adding alkali to adjust the pH value in the reactor to be 8.5-9.0, thereby obtaining a semi-rigid modified melamine resin;
    step (3): curing and foaming: feeding a foaming agent, emulsifier, auxiliary agent and curing agent into a stirring reactor, and uniformly stirring and mixing to obtain a mixed auxiliary agent; pumping the mixed auxiliary agent and the semi-rigid modified melamine resin into an emulsifying machine to mix and emulsify, thereby forming an emulsified resin; placing the emulsified resin into a microwave heating chamber and performing microwave foaming, thereby forming a semi-rigid melamine foam plastic product with a high-density open-cell structure;
    step (4): cutting and drying: cutting the semi-rigid melamine foam plastic product obtained in step (3) through a cutting machine and then drying, thereby obtaining a finished semi-rigid melamine foam plastic product.

2. The method for preparing the semi-rigid melamine foam plastic product of claim 1, wherein the amount of PVA is 1-15 wt % of the amount of the solid melamine powder, and the amount of APTES is 5-25 wt % of the amount of the solid melamine powder.

3. The method for preparing the semi-rigid melamine foam plastic product of claim 1, wherein the molar ratio of the solid melamine powder, paraformaldehyde and formaldehyde solution is 1:2-3:1-2.

4. The method for preparing the semi-rigid melamine foam plastic product of claim 1, wherein the feeding mass ratio of the semi-rigid modified melamine resin to the mixed auxiliary agent is 100:10-40.

5. The method for preparing the semi-rigid melamine foam plastic product of claim 1, wherein the foaming agent is one or a mixture selected from water, pentane, hexane and petroleum ether, the emulsifier is one or a mixture selected from alkylphenol ethoxylates, fatty acid polyglycol ether and alkyl trimethyl ammonium salt, and the curing agent is one or a mixture selected from sulfuric acid, hydrochloric acid, formic acid, acetic acid and nitric acid.

6. The method for preparing the semi-rigid melamine foam plastic product of claim 1, wherein the alkali used for adjusting the pH value is any one selected from a sodium hydroxide solution having a mass percent concentration of 30-40% and triethanolamine, and the acid used for adjusting the pH value is any one selected from a nitric acid solution having a 45% mass percent concentration, a hydrochloric acid solution having a 30% mass percent concentration, an acetic acid solution having a 35% mass percent concentration and a formic acid solution having a 30% mass percent concentration.

7. The method for preparing the semi-rigid melamine foam plastic product of claim 1, wherein the auxiliary agent is one or a combination selected from a reinforced material, a nanomaterial, a pigment, a hydrophobic agent, wherein the amount of the auxiliary agent is 0-10 wt % of the amount of the semi-rigid modified melamine resin.

8. The method for preparing the semi-rigid melamine foam plastic product of claim 1, wherein the amount of PVA is 5-12 wt % of the amount of the solid melamine powder, and the amount of APTES is 10-20 wt % of the amount of the solid melamine powder.

* * * * *